(12) United States Patent
Muthiah

(10) Patent No.: US 11,914,894 B2
(45) Date of Patent: Feb. 27, 2024

(54) USING SCHEDULING TAGS IN HOST COMPUTE COMMANDS TO MANAGE HOST COMPUTE TASK EXECUTION BY A STORAGE DEVICE IN A STORAGE SYSTEM

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/176,833

(22) Filed: Feb. 16, 2021

(65) Prior Publication Data

US 2022/0179585 A1 Jun. 9, 2022

Related U.S. Application Data

(60) Provisional application No. 63/122,541, filed on Dec. 8, 2020.

(51) Int. Cl.
*G06F 3/06* (2006.01)

(52) U.S. Cl.
CPC .......... *G06F 3/0659* (2013.01); *G06F 3/0625* (2013.01); *G06F 3/0631* (2013.01); *G06F 3/0653* (2013.01); *G06F 3/0673* (2013.01)

(58) Field of Classification Search
CPC .... G06F 3/0659; G06F 3/0625; G06F 3/0631; G06F 3/0653; G06F 3/0673
See application file for complete search history.

(56) References Cited

U.S. PATENT DOCUMENTS

| | | | | |
|---|---|---|---|---|
| 6,128,672 | A | * | 10/2000 | Lindsley ............... G06F 9/4812 710/48 |
| 8,516,232 | B2 | | 8/2013 | Dolgunov et al. |
| 10,409,496 | B1 | * | 9/2019 | Si ........................... G06F 3/0608 |
| 2015/0095521 | A1 | * | 4/2015 | Hackborn ............. G06F 3/0653 710/18 |
| 2016/0203049 | A1 | * | 7/2016 | Kim ....................... G11C 29/42 714/721 |
| 2017/0300269 | A1 | * | 10/2017 | Um ....................... G06F 3/0659 |
| 2020/0005516 | A1 | * | 1/2020 | Apodaca ............... G06T 15/005 |
| 2020/0034073 | A1 | * | 1/2020 | Saha ........................ G06F 3/067 |
| 2020/0349069 | A1 | * | 11/2020 | Yu ....................... G06F 12/0246 |
| 2020/0393968 | A1 | * | 12/2020 | Kawase .................. H03M 7/30 |
| 2021/0405915 | A1 | * | 12/2021 | Agarwal ............... G06F 3/0604 |
| 2021/0405924 | A1 | | 12/2021 | Muthiah et al. |
| 2022/0365782 | A1 | * | 11/2022 | Wang ..................... G06F 17/16 |

OTHER PUBLICATIONS

Kang, Y., et al., Enabling cost-effective data processing with smart SSD, 2013 IEEE 29th Symposium on Mass Storage Systems and Technologies (MSST), Long Beach, CA, USA, 2013, pp. 1-12.

* cited by examiner

*Primary Examiner* — Charles Rones
*Assistant Examiner* — Alexander Vinnitsky
(74) *Attorney, Agent, or Firm* — PATENT LAW WORKS LLP

(57) ABSTRACT

Example storage systems, storage devices, and methods provide management of idle time compute tasks from host systems. Storage devices may receive host storage commands for reading and writing host data and host compute commands for executing host compute tasks. Some host compute commands may include a scheduling tag. The storage device may operate in a storage processing state and an idle state and may selectively execute delayed host compute tasks during the idle state.

20 Claims, 9 Drawing Sheets

USING SCHEDULING TAGS IN HOST COMPUTE COMMANDS TO MANAGE HOST COMPUTE TASK EXECUTION BY A STORAGE DEVICE IN A STORAGE SYSTEM

TECHNICAL FIELD

The present disclosure generally relates to host compute tasks allocated to data storage devices, and in a more particular example, to management of compute tasks by the storage device.

BACKGROUND

Often, distributed storage systems are used to store large amounts (e.g., terabytes, petabytes, exabytes, etc.) of data, such as objects or files in a distributed and fault-tolerant manner with a predetermined level of redundancy. In some storage systems, hosts may allocate compute tasks to storage devices, in addition to basic read/write/delete operations.

Certain storage applications may have a variety of compute tasks with varying levels of urgency. Some host-assigned compute tasks may have definite completion requirements, while others may be more flexible in their timing requirements. Edge storage devices have computation capabilities and limitations and may be required to manage host-assigned compute tasks alongside host data storage input/output (I/O) requirements and background tasks for managing stored data, such as garbage collection, media scan, wear leveling and data migration, storage device health tracking, etc.

In some cases, various different applications may have different quality-of-service (QoS) requirements, and sometimes, during peak loads, the storage devices that the applications rely upon may not be able to keep up with the latency requirements. For instance, the combined volume of host I/O and compute requests may exceed the capabilities of the storage devices, the high volume may cause the performance of the storage devices to slow down and/or experience failures or faults, etc. A storage device rendering a result late in time may sharply affect performance such that the storage device no longer meets its expected QoS specifications (e.g., as measured by parts per million).

When the QoS of a storage device drops and causes delayed results, latency, failures, etc. (e.g., due to the device choking), the application may churn or seek other storage options. In some cases, the devices attempt to handle these scenarios and limit such issues, but these attempts have proved inadequate, particularly at scale and/or when demanding processing timelines are applicable.

A need exists for at least storage systems that are capable of mitigating the above-noted delays, latency, and/or other failures.

SUMMARY

Various aspects for management of idle-time compute tasks by storage systems are described.

One general aspect includes a storage system that include a storage device including a storage medium configured to store host data and a storage controller, including a processor and a memory, configured to: receive host storage commands for reading and writing the host data in the storage medium; receive host compute commands for executing, using the processor, host compute tasks, where the host compute commands each include a scheduling tag; determine a storage processing state for executing host storage commands; determine an idle state for executing background tasks in an absence of pending host storage commands; and selectively execute, based on the scheduling tag of a first host compute command, a first host compute task during the idle state.

Implementations may include one or more of the following features. The storage controller may be further configured to selectively execute, based on the scheduling tag of a second host compute command, a second host compute task during the storage processing state. The scheduling tag of the first host compute command may indicate a delayed compute task and the scheduling tag of the second host compute command may indicate a real-time compute task. The storage controller may be further configured to: allocate host storage tasks from the host storage commands to a storage processing queue; allocate background tasks to an idle state processing queue; allocate, based on the scheduling tag of the first host compute command, the first host compute task to the idle state processing queue; and allocate, based on the scheduling tag of the second host compute command, the second host compute task to the storage processing queue. The storage controller may be further configured to selectively execute, before the background tasks in the idle state processing queue, the first host compute task. The idle state processing queue may include a plurality of background tasks, each background task of the plurality of background tasks may include a background task priority value, the idle state processing queue may have a queue order based on the background task priority values, the scheduling tag of the first host compute command may include a compute task priority value, and the storage controller may be further configured to insert, based on a comparison of the compute task priority value and adjacent background task priority values of adjacent background tasks in the queue order of the idle state processing queue, the first host compute task between the adjacent background tasks in the queue order of the idle state processing queue. The background tasks may be selected from: garbage collection tasks, media scan tasks, wear levelling tasks, internal data migration tasks, and storage device health tracking tasks. The storage controller may be further configured to selectively execute, responsive to the storage processing queue being empty, a portion of the first host compute task during the storage processing state. The storage system may include a host system and the host system may include a host processor, a host memory, a request handler, and a task segregation engine. The request handler may be configured to: determine compute requests for at least one host application; and generate, based on the compute requests, host compute commands, where the host compute commands include the first host compute command and the second host compute command. The task segregation engine may be configured to: determine the first host compute task; and add, to the first host compute command, the scheduling tag of the first host compute command. The request handler may be further configured to generate a plurality of delayed host compute tasks, the plurality of delayed host compute tasks may include the first host compute task, and the task segregation engine may be further configured to add a delayed scheduling tag to each host compute command for each delayed compute task of the plurality of delayed host compute tasks. The storage controller may be further configured to: accumulate, during the storage processing state, background tasks in an idle state processing queue; and accumulate, during the storage processing state, the plurality of delayed host compute tasks in the idle state processing queue. The storage controller may be further configured to:

receive control commands for changing among the storage processing state, the idle state, and a power saving state; determine, based on the accumulated background tasks and the accumulated plurality of delayed host compute tasks in the idle state processing queue, an idle processing time; and send the idle processing time to the host system. The host system may further include a time manager, where the time manager is configured to: monitor an idle state elapsed time during the idle state; and delay a control command for the power saving state until the idle state elapsed time meets the idle processing time.

Another general aspect includes a computer-implemented method that includes: receiving, by a storage device, host storage commands for reading and writing host data in a storage medium of the storage device; receiving, by the storage device, host compute commands for executing host compute tasks, where the host compute commands each include a scheduling tag; determining, by the storage device, a storage processing state for executing host storage commands; determining, by the storage device, an idle state for executing background tasks in an absence of pending host storage commands; selectively executing, by the storage device and based on the scheduling tag of a first host compute command, a first host compute task during the idle state; and selectively executing, by the storage device and based on the scheduling tag of a second host compute command, a second host compute task during the storage processing state.

Implementations may include one or more of the following features. The computer-implemented method may include: allocating, by the storage device, host storage tasks from the host storage commands to a storage processing queue; allocating, by the storage device, background tasks to an idle state processing queue; allocating, by the storage device and based on the scheduling tag of the first host compute command, the first host compute task to the idle state processing queue; and allocating, by the storage device and based on the scheduling tag of the second host compute command, the second host compute task to the storage processing queue. The computer-implemented method may include selectively executing, by the storage device and before executing the background tasks in the idle state processing queue, the first host compute task. The computer-implemented method may include: ordering, by the storage device and based on a background task priority value for each background task of the plurality of background tasks, the idle state processing queue in a queue order; and inserting, by the storage device and based on a comparison of a compute task priority value and adjacent background task priority values of adjacent background tasks in the queue order of the idle task processing queue, the first host compute task between the adjacent background tasks in the queue order of the idle task processing queue, where the scheduling tag of the first host compute command includes the compute task priority value. The computer-implemented method may include selectively executing, by the storage device and responsive to the storage processing queue being empty, a portion of the first host compute task during the storage processing state. The computer-implemented method may include: determining, by a host system, compute request for at least one host application; generating, by the host system and based on the compute requests, host compute commands, where the host compute commands include the first host compute command and the second host compute command; adding, by the host system and to the first host compute command, the scheduling tag of the first host compute command; adding, by the host system and to the second host compute command, the scheduling tag of the second host compute command; and sending, by the host system, the host compute commands to the storage device. The computer-implemented method may include: generating, by the host system, a plurality of delayed host compute tasks, where the plurality of delayed host compute tasks includes the first host compute task; adding, by the host system, a delayed scheduling tag to each host compute command for each delayed compute task of the plurality of delayed host compute tasks; accumulating, by the storage device and during the storage processing state, background tasks in an idle state processing queue; and accumulating, by the storage device and during the storage processing state, the plurality of delayed host compute tasks, in the idle state processing queue. The computer-implemented method may include: receiving, by the storage device and from the host system, control commands for changing among the storage processing state, the idle state, and a power saving state; determining, based on the accumulated background tasks and the accumulated plurality of delayed host compute tasks in the idle state processing queue, an idle processing time; monitoring, by the host system, an idle state elapsed time for the storage device during the idle state; and delaying, by the host system, a control command for the power saving mode until the idle state elapsed time meets the idle processing time.

Still another general aspect includes a system that includes: a storage device including a storage medium configured to store host data; means for receiving host storage commands for reading and writing the host data in the storage medium; means for receiving host compute commands for executing host compute tasks, where the host compute commands each include a scheduling tag; means for determining a storage processing state for executing host storage commands; means for determining an idle state for executing background tasks in an absence of pending host storage commands; and means for selectively executing, based on the scheduling tag of a first host compute command, a first host compute task during the idle state.

The various embodiments improve the functionality of storage systems to overcome or at least reduce the issues in the storage networks and/or systems discussed above and, accordingly, are more reliable and/or efficient than other computing networks. That is, the various embodiments disclosed herein include hardware and/or software that advantageously improves compute task scheduling, such as by selectively scheduling compute tasks to use storage device idle time. It should be understood that the technology provides numerous additional advantages and benefits, as discussed in further detail herein. Accordingly, the embodiments disclosed herein provide various improvements to storage devices, storage systems, and/or storage networks.

It should be understood that the language used in the present disclosure has been principally selected for readability and instructional purposes, and not to limit the scope of the subject matter disclosed herein.

DETAILED DESCRIPTION

Figure 1:
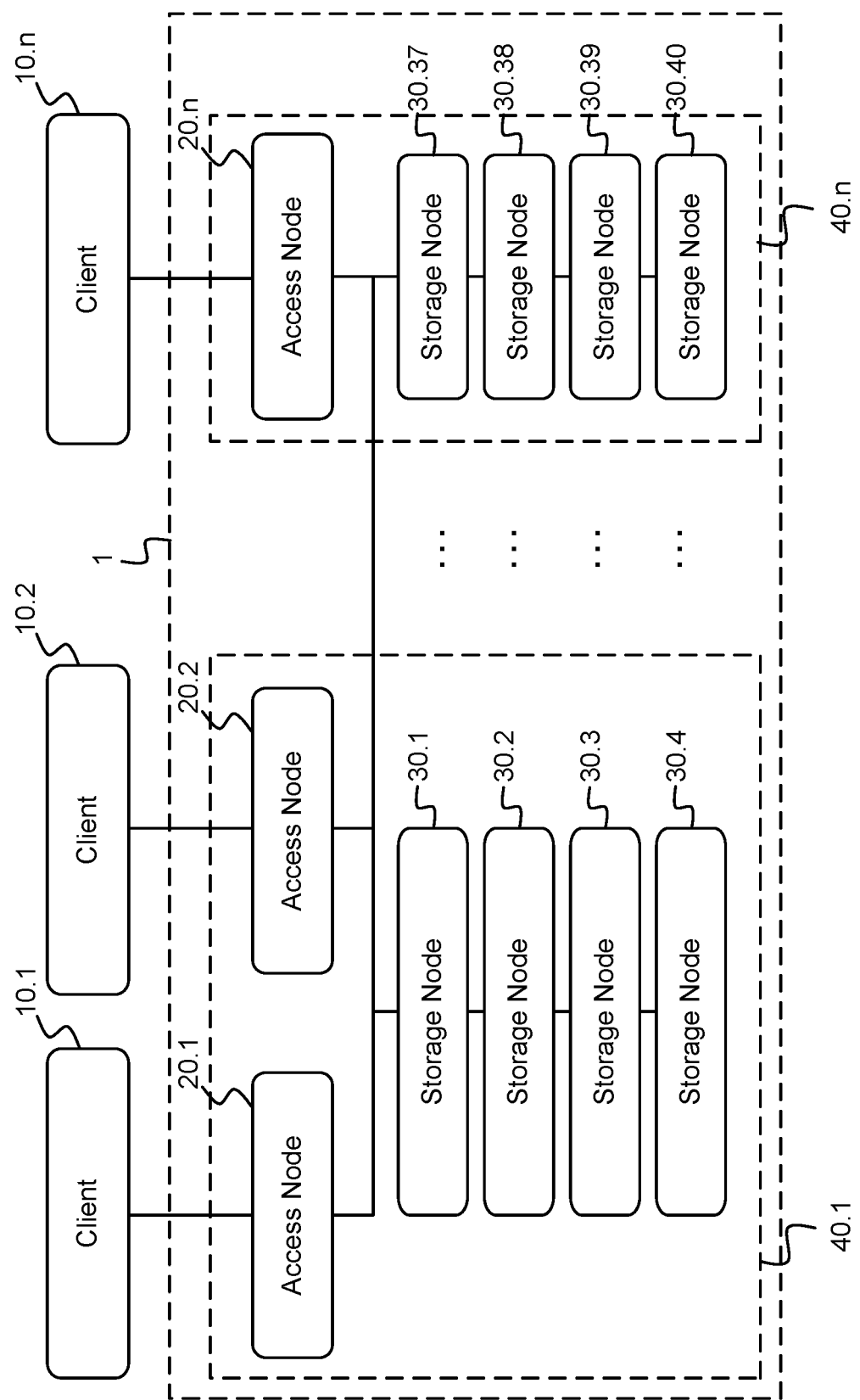
FIG. 1 schematically illustrates an example of a storage system.

FIG. 1 shows an embodiment of an example storage system 1. In some embodiments, storage system 1 may be implemented as a distributed file, object, or other data storage system which is coupled to one or more clients 10.1-10.*n* for accessing data through one or more controller or access nodes 20.1-10.*n*.

The storage system 1 may include a plurality of controller or access nodes 20 and a plurality of storage nodes 30 which may be coupled in a suitable way for transferring data, for example by means of any suitable data communication network, such as a local area network (LAN), a wide area network (WAN), an intranet, the Internet, a cell phone network, or any combination of communication networks. Access nodes 20, storage nodes 30, and the computing devices comprising clients 10 may connect to the data communication network using any suitable wireless, optical, etc., network connections or any suitable combination of such network connections.

Controller or access nodes 20 may comprise a host system (also referred to as a host layer) that provides access to storage system 1 for clients 10. For example, the host system may expose application programming interfaces (APIs) or any other suitable request handling interfaces that clients 10 may interact with to access data and/or perform computing functions. Storage nodes 30 may each comprise or include one or more storage devices that store and provide access to host data stored in their respective storage media and/or perform various compute functions.

Clients 10 may run or interface with one or more applications that use data stored in the storage system 1. Such an application could, for example, be a dedicated software application running on a client computing device, such as a personal computer, a laptop, a mobile phone, or any other type of communication device that can interface directly with storage system 1.

In further embodiments, the applications could, for example, comprise a suitable file system which enables a general-purpose software application to interface with storage system 1, an API library for storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

Although the embodiment of FIG. 1 shows only three access nodes 20 and forty storage nodes 30, storage system 1 could comprise any other suitable number of interconnected access nodes 20 and storage nodes 30, such as but not limited to two, four, tens, hundreds, etc., or more access nodes 20 and two or more, tens, hundreds, etc., storage nodes 30.

These access nodes 20 and storage nodes 30 may be built as general-purpose computers or may be specially configured and/or physically adapted, such as configured for arrangement in large data centers (e.g., suitably configured to be arranged in modular racks 40.1-40.*n* comprising standard dimensions). Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces.

An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30.

In some embodiments, HTTP/REST protocols complying with the Amazon Simple Storage Service (S3) object storage service may enable data transfer through a REST application protocol interfaces (API), although other storage protocols are also contemplated, such as network file system (NFS) protocols, non-volatile memory (NVM) protocols, etc.

In some embodiments, access nodes 20 may operate as a highly available cluster of controller nodes with one or more integrated and/or independent interface systems, and provide for example shared access to the storage nodes 30, metadata caching, protection of metadata, etc.

In some embodiments, clients 10, access nodes 20, and/or storage nodes 30 may be interconnected using one or more network fabric protocols and related physical and logical network interface. For example, storage nodes may include non-volatile memory express (NVMe) compliant storage devices, such as solid-state drives (SSD) connected via peripheral component interconnect express (PCIe) physical interfaces. Storage nodes 30 may include NVMe interface controllers or other suitable controllers to connect to a wider network infrastructure, such as a Fibre Channel or Ethernet network that supports NVMe traffic.

As shown in FIG. 1 several storage nodes 30 can be grouped together, for example because they are housed in a single rack 40. For example, storage nodes 30.1-30.4 and 30.37-30.40 each are respectively grouped into racks 40.1 and 40.*n*. Access nodes 20 may be located in the same or different racks as the storage nodes to which the access nodes connect. A rack may have multiple access nodes, for example rack 40.1, a single access node as rack 40.*n*, or no access nodes (not shown) and rely on an access node in another rack or storage nodes or clients with built-in access node and/or controller node capabilities. These racks are not required to be located at the same location. They are often geographically dispersed across different data centers, for example, rack 40.1 can be located at a data center in Europe and 40.*n* at a data center in the USA. In further embodiments, other variations may apply where storage node 30 groups may be virtual or comprised of storage nodes 30 that are disparately located.

Figure 2:
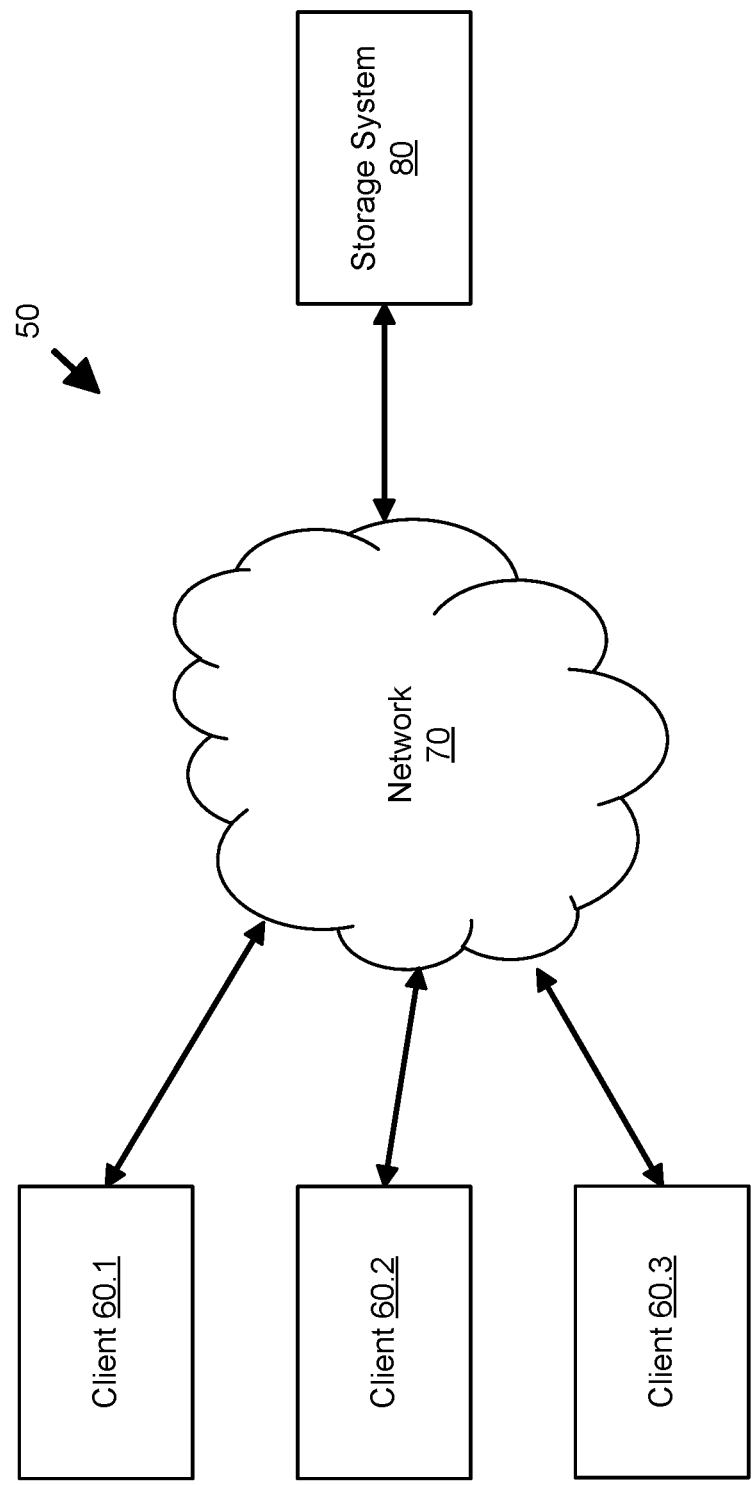
FIG. 2 schematically illustrates an example client architecture in which the storage system of FIG. 1 may operate.

FIG. 2 is a block diagram of an example storage network 50 using a client architecture. In some embodiments, storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or a hybrid thereof) capable of accessing storage system 80 utilizing network 70. Each client device 60, as part of its respective operation, relies on sending input/output (I/O) requests to the storage system 80 to write data, read data, and/or modify data. Specifically, each client device 60 can transmit I/O requests to read, write, store, communicate, propagate, and/ or transport instructions, data, computer programs, software, code, routines, etc., to the storage system 80. Client device (s) 60 and storage system 80 may comprise at least a portion of a client-server model. In general, the storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as storage system 1 in FIG. 1. In some embodiments, a storage system 80 may be a local storage system that is coupled directly to a client 60 via a wired connection or a local network connection (a consumer's Wi-Fi™ network). Other variations are also applicable.

Figure 3:
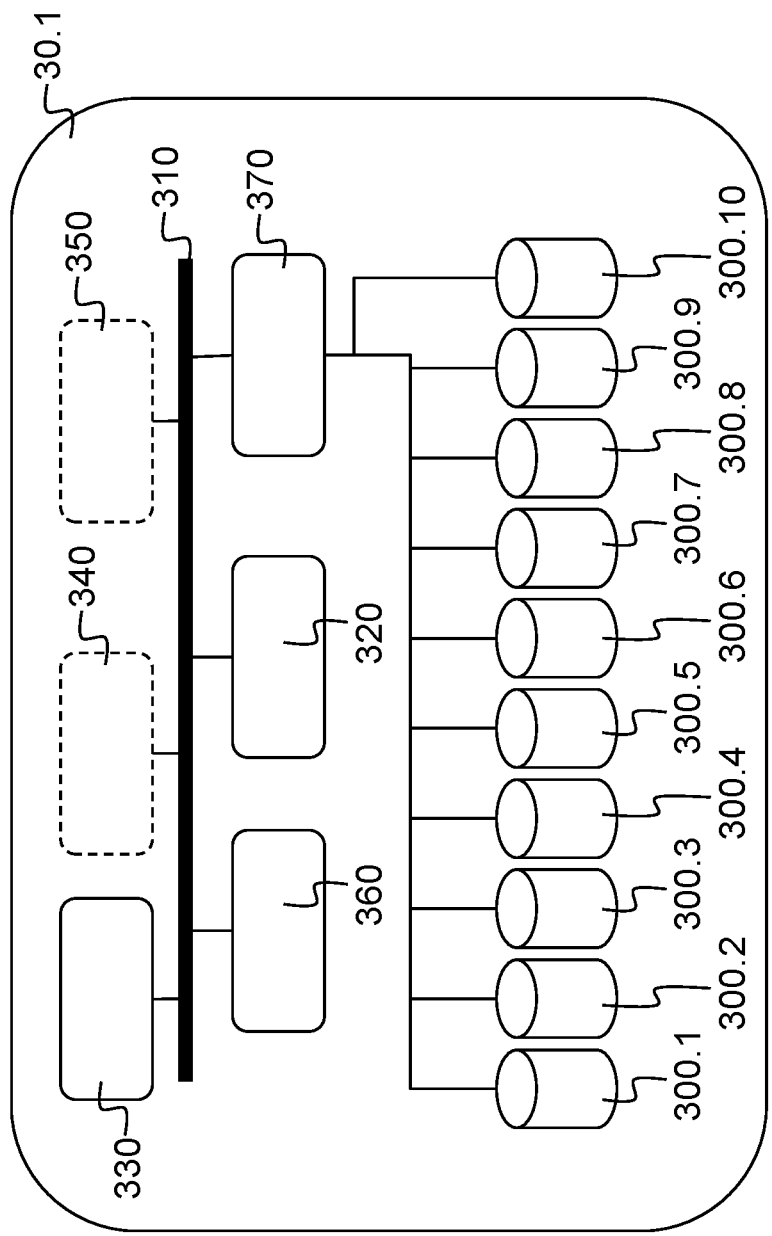
FIG. 3 schematically illustrates an example of a storage node of the storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of suitable processor or microprocessor that interprets and executes instructions. Local memory 330 may include random-access memory (RAM) or another type of dynamic storage device that stores information and instructions for execution by processor 320 and/or a read-only memory (ROM) or another type of static storage device that stores static information and instructions for use by processor 320. Input unit 340 may include one or more suitable mechanisms that permit an operator to input information to the storage node 30.1, such as a keyboard, a mouse, a pen, voice recognition and/or biometric mechanisms, etc. Output unit 350 may include one or more suitable mechanisms that output information to the operator, such as a display, a printer, a speaker, etc. Communication interface 360 may include any transceiver-like mechanism that enables storage node 30.1 to communicate with other devices and/or systems, for example, mechanisms for communicating with other storage nodes 30 or access nodes 20, such as, for example, gigabit (Gb) Ethernet interfaces.

Storage element interface 370 may comprise a storage interface, for example, a SATA interface, a small computer system interface (SCSI), a serial attached SCSI (SAS), a fibre channel interface, a PCIe/NVMe interface, or another suitable interface, for connecting bus 310 to one or more storage elements 300. Storage elements 300 may include one or more local storage drives, for example, multi-terabyte (TB) SATA disk drives, or multi-TB NVMe SSDs, or another suitable storage drive, and storage element interface 370 may control the reading and writing of data to/from these storage elements 300. In one exemplary embodiment, as shown in FIG. 3, such a storage node 30.1 could comprise ten 6 TB SATA disk drives as storage elements 300.1-300.10 and, in this way, storage node 30.1 would provide a storage capacity of 60 TB to storage system 1.

According to the exemplary embodiment of FIG. 1, and in the event that storage nodes 30.2-30.40 are identical to storage node 30.1 and each comprises a storage capacity of 60 TB, the storage system 1 would then have a total storage capacity of 2400 TB. Similarly, storage node 30.1 could comprise ten 2 TB SSDs as storage elements 300.1-300.10 and provide 20 TB to the storage system 1, resulting in a total storage capacity of 800 TB. Any suitable storage capacity is applicable. For instance, in some configurations, the storage system 1 may include a mix of storage nodes with different configurations, such as SSDs, hard disk drives (HDDs), hybrid drives, tape drives, other storage device types, etc., of varying capacities.

As is clear from FIGS. 1 and 3, the storage system 1 may comprise a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the storage system. Each of the storage nodes 30 may comprise a share of these storage elements 300.

As shown in FIG. 3, storage node 30.1 comprises ten storage elements 300.1-300.10. Other storage nodes 30 could comprise a similar amount of storage elements 300 or may have different amounts, depending on the configuration. Storage node 30.2 could, for example, comprise six storage elements 300.11-300.16, and storage node 30.3 could, for example, comprise four storage elements 300.17-300.20.

The storage elements 300 or a portion thereof may be redundant and operate independently of one another. For instance, if one particular storage element 300 fails its function it could conveniently be taken on by another storage element 300 in the storage system 1.

In some embodiments, storage elements 300 may include storage devices, such as disk drives, SSDs, or other storage devices, configured as edge storage devices. In some embodiments, each storage device may include a storage device controller and a storage medium or media configured to store host data. In some embodiments, the storage device controller may include on or more processing units configured to execute instructions in one or more programs. In some embodiments, the one or more processors may be configured to perform host compute tasks, such as data transformation, segregating encoded media frames, domain transformation, formatting or transforming raw data, etc. on host data stored in the storage medium or media devices. In some embodiments, media devices comprising the storage medium may be coupled to the storage device controller through connections that typically convey commands, in addition to data, and optionally convey metadata, error correction information, and/or other information in addition to data values to be stored in or read from the media devices. In some embodiments, memory devices may include any number (i.e., one or more) of memory devices including, without limitation, non-volatile semiconductor memory devices, such as flash memory devices.

Figure 4:
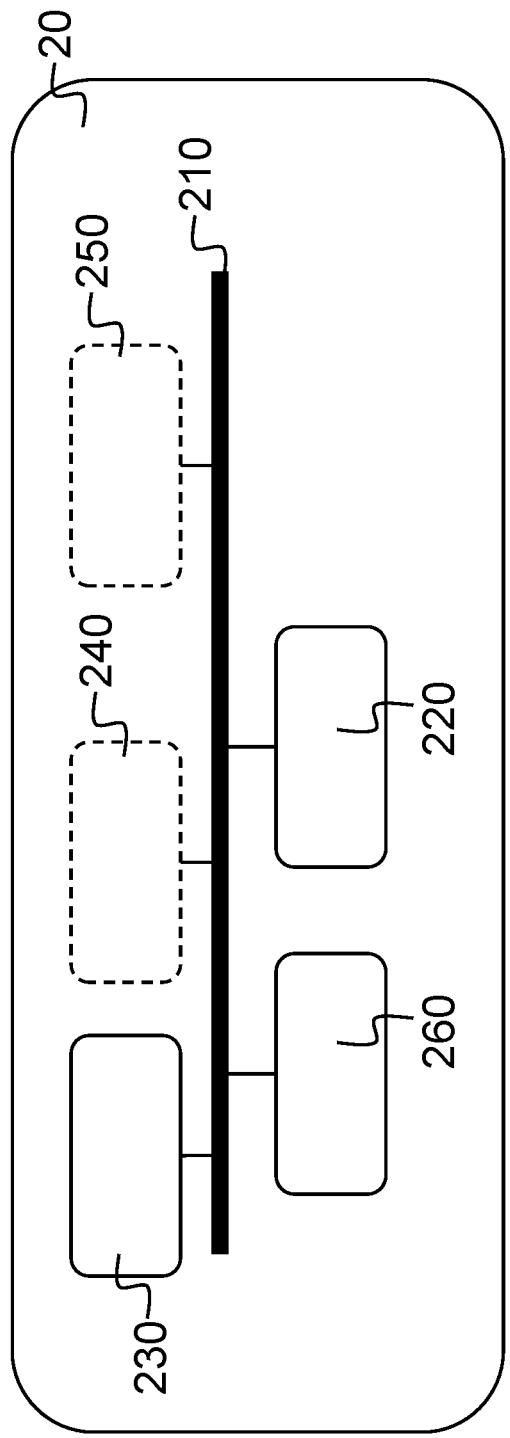
FIG. 4 schematically illustrates an example of a controller node or access node of the storage system of FIG. 1.

FIG. 4 shows a schematic representation of an embodiment of the controller or access node 20. Access node 20 may include storage controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, metadata and/or transaction management, version control management, and/or replication engines. In some embodiments, access node 20 may implement redundant array of independent disks (RAID) controller functions, such as the mapping of redundant data and/or related parity data into RAID chunks and stripes distributed among storage nodes 30 and/or storage elements 300.

Bus 210 may include one or more conductors that permit communication among the components of access node 20. Processor 220 may include any type of suitable processor or microprocessor that interprets and executes instructions. Local memory 230 may include a random access memory (RAM) or another type of dynamic storage device that stores information and instructions for execution by processor 220 and/or a read-only memory (ROM) or another type of static storage device that stores static information and instructions for use by processor 320 and/or any suitable storage elements such as a hard disk or a solid-state storage element. An optional input unit 240 may include one or more suitable mechanisms that permit an operator to input information to the access node 20 such as a keyboard, a mouse, a pen, voice recognition and/or biometric mechanisms, etc. Optional output unit 250 may include one or more suitable mechanisms that output information to the operator, such as a display, a printer, a speaker, etc. Communication interface 260 may include any transceiver-like mechanism that enables access node 20 to communicate with other devices and/or systems, for example, mechanisms for communicating with other storage nodes 30 or access nodes 20 such as, for example, Gb Ethernet interfaces.

In some embodiments, access node 20 may be configured as a host system for storage nodes 30 and/or storage elements 300 that manages distributed compute functions in addition to storage access. For example, access node 20 may be configured to use processor 220 to execute instructions in one or more programs from memory 230 to manage distributed computing functions for manipulating host data stored in edge storage devices. In some embodiments, access node 20 may be configured to receive storage-centric compute requests from clients 10 and distribute and manage the performance of corresponding host compute tasks, such as data transformation, segregating encoded media frames, domain transformation, formatting or transforming raw data, etc. on host data stored in storage nodes 30 and/or storage elements 300.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
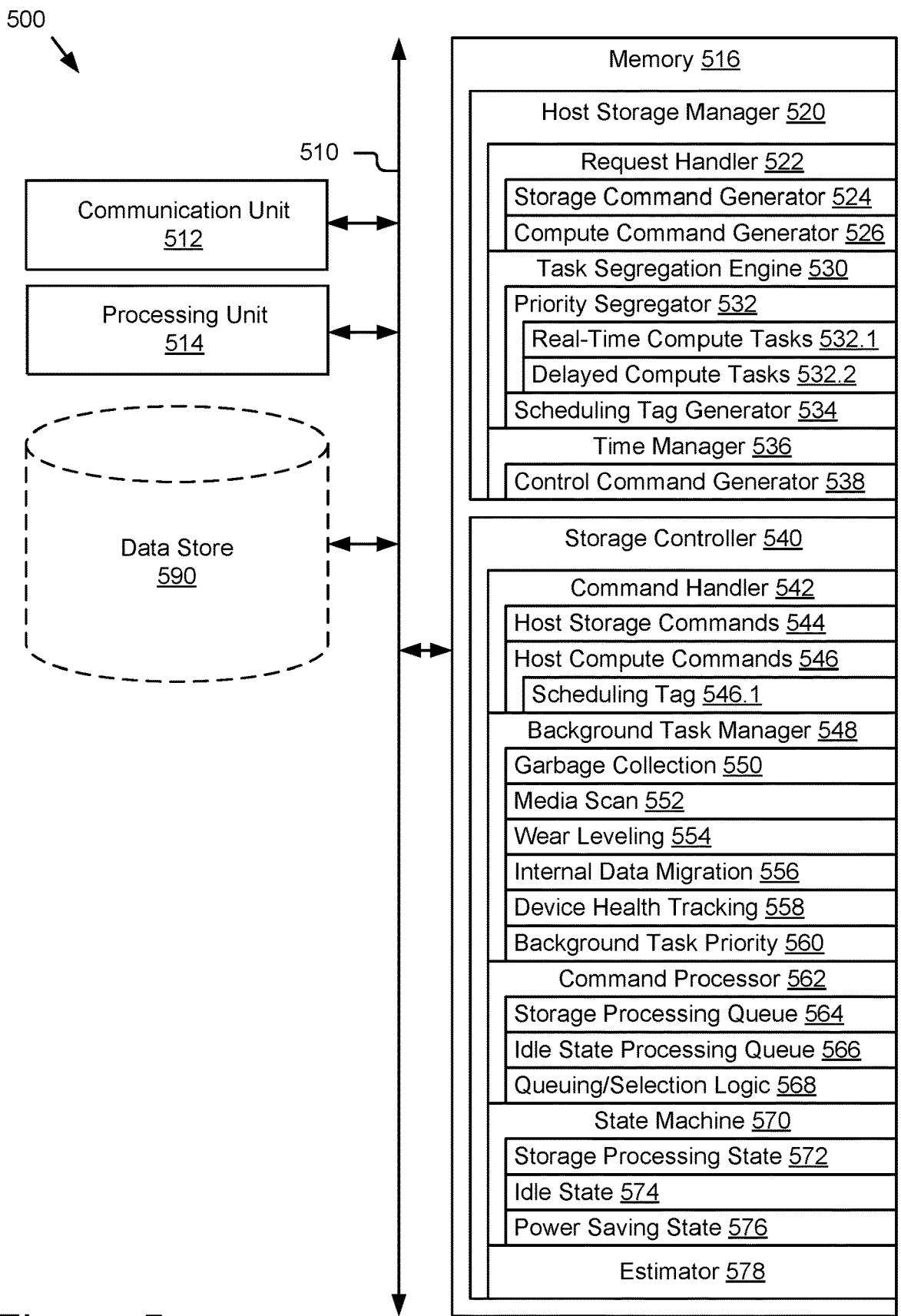
FIG. 5 schematically illustrates one or more example storage system components configured for idle time compute tasks.

FIG. 5 illustrates a block diagram of an example storage system 500 that may embody various different components of a storage system, such as a host system and/or storage device. In some embodiments, the storage system 500 may incorporate elements and configurations similar to those shown in FIGS. 1-4. For example, the computing system 500 may embody one or more access nodes 20, one or more storage nodes 30, and/or one or more storage elements 300, and may be configured with one or more of the components shown. In some embodiments, some components shown may be included in a host system, such as a storage controller of access node 20 or storage node 30, and some components may be included in one or more storage devices, such as storage elements 300. Other variations are also possible.

As shown, storage system 500 may include a bus 510 interconnecting at least one communication unit 512, at least one processing unit 514, and at least one memory 516. The bus 510 may include one or more wired or wireless couplings (e.g., conductors) that permit communication among the components of storage system 500. Communication unit 512 may include any transceiver-like mechanism that enables storage system 500 and/or the components thereof to communicate with other devices and/or systems. For example, communication unit 512 may include wired or wireless mechanisms for communicating with computing system or storage system clients, other access systems, and/or one or more data storage systems or components. In some embodiments, communication unit 512 may enable communication among fabric nodes in a storage network fabric and host systems, access nodes, storage nodes, and/or subcomponents thereof, such as storage devices, may be configured as fabric nodes.

Processing unit 514 may include any type of processor or microprocessor that interprets and executes instructions. Memory 516 may include a random access memory (RAM) or another type of dynamic storage device that stores information and instructions for execution by processing unit 514 and/or a read-only memory (ROM) or another type of static storage device that stores static information and instructions for use by processing unit 514 and/or any suitable storage elements such as a hard disk or a solid-state storage element.

Depending on the configuration, storage system 500 may include or have access to one or more databases and/or specialized data stores, such as a metadata store. The databases may include one or more data structures for storing, retrieving, indexing, searching, filtering, etc. of structured and/or unstructured data elements. The databases, metadata store, etc., and/or other databases or data structures may be maintained and managed in storage system 500 or separate computing systems, such as storage nodes, controller nodes, or access nodes, with separate communication, processor, memory, and other computing resources and accessed by storage system 500 through data access protocols.

Storage system 500 may include a data store 590 comprised of one or more storage media, such as the non-transitory storage media discussed herein (e.g., 644, those discussed with reference to the storage nodes 30, etc.). In some embodiments, data store 590 may include host data stored in the storage medium of one or more edge storage devices, such as storage nodes 30, storage elements 300, and/or other storage devices.

Storage system 500 may include a plurality of executable components or subsystems that are stored and/or instantiated in instructions and/or operations in memory 516 for execution by processing unit 514. For example, memory 516 may include a host storage manager 520 configured to manage host storage and compute commands for one or more storage devices and having a request handler 522, a task segregation engine 530, and a time manager 536. Memory 516 may include a storage controller 540 configured to manage storage and compute operations targeting a storage medium and having a command handler 542, a background task manager 548, a command processor 562, a state machine 570, and an estimator 578. These components may comprise computer logic executable to perform the acts and functionality described herein. Some or all of the components 520, 530, 536, 540, 542, 548, 562, 570, and/or 578 and subcomponents thereof may be implemented using software instructions or operations executable by processing units 514, using hardware, such as but not limited to a field-programmable gate array (FPGA), an application-specific integrated circuit (ASIC), etc., and/or a combination of hardware and software, etc. In some embodiments, storage system 500 may include multiple computing systems, where each computing system includes one or more busses, communication units, processing units, memories, data stores, and at least a portion of the executable components or subsystems in memory 516. For example, host storage manager 520 may be instantiated in a host system, such as client 10, access node 20, or storage node 30, and storage controller 540 may be instantiated in a storage device, such as storage element 300, in communication with the host system.

Host storage manager 520 may include an interface protocol and/or set of functions, parameters, and/or data structures for managing storage and compute commands to one or more storage devices, such as through storage controller 540. For example, host storage manager 520 may include functions for receiving and processing storage and compute requests from one or more client applications and generating and managing corresponding storage commands and compute commands to target storage devices. In some embodiments, host storage manager 520 may be configured to manage command allocation and timing to support predetermined quality of service (QoS) and/or completion time metrics. For example, host storage manager 520 may determine whether compute requests are real-time compute requests or non-real-time compute requests that may be delayed for later processing to allow for real-time processing of storage requests and real-time compute commands using available storage device processing capacity and other resources.

In some embodiments, host storage manager 520 may include a plurality of hardware and/or software modules configured to use processor 514 and memory 516 to handle or manage defined operations of host storage manager 520. For example, host storage manager 520 may include a request handler 522 configured to receive application requests and generate corresponding storage and/or compute commands. Host storage manager 520 may include a task segregation engine 530 configured to determine compute requests that may be serviced by real-time compute tasks and compute requests that may be serviced by delayed compute tasks. Host storage manager 520 may include a time manager 536 configured to manage the processing time and related time constraints for compute tasks allocated to storage devices and, in some embodiments, manage the processing states of storage devices with various control commands.

Request handler 522 may be configured to receive and/or determine storage requests and compute requests from one or more applications and generate corresponding commands. For example, request handler 522 may provide an API or function call that enables host or client applications to request operations targeting host data stored in one or more edge storage devices. In some embodiments, request handler 522 may handle storage requests and compute requests through distinct interfaces and/or processing paths. For example, request handler 522 may include a storage command generator 524 and a compute command generator 526. Storage command generator 524 may be configured to generate storage I/O commands, such as read commands, write commands, and delete commands targeting host data in data store 590. For example, storage command generator 524 may parse incoming storage requests and generate storage commands that target a specific host logical block address (LBA) or data object identifier, such as a globally unique identifier (GUID), for a read, write, or delete operation configured to store, retrieve, or remove host data from data store 590. Compute command generator 526 may be configured to generate compute commands, such host data transformations, that read, process, and return or store derivative data from host data in data store 590. For example, compute command generator may parse incoming compute requests and generate compute commands that target a specific set of host LBAs and/or GUIDs for a defined compute operation, such as a data transformation algorithm, a media frame detection and separation algorithm, an event or object detection algorithm, and/or a domain transformation algorithm, creating derivative data from the targeted host data. Compute commands may return transformed or derivative data to host storage manager 520, such as to return a result to the requesting application and/or store the result to another storage device, and/or store the transformed or derivative data back to data store 590, with or without modifying the raw host data in data store 590.

Task segregation engine 530 may be configured to receive or determine pending compute commands and determine whether they should be handled as real-time compute requests or may be delayed for idle-time processing. For example, task segregation engine 530 may be configured in the processing path for compute requests through compute command generator 526 and may segregate compute commands between real-time compute commands and delayed compute commands based on a compute task priority associated with and/or determined from the corresponding compute request and/or compute command. In some embodiments, task segregation engine 530 may include a priority segregator 532 configured to determine a compute task priority value for each compute request and/or compute command and assign the compute command based on at least real-time compute tasks 532.1 and delayed compute tasks 532.2. For example, task segregation engine 530 may parse one or more parameters from the compute request and/or compute command, such as a client defined compute task priority value or a compute task type that maps to a compute task priority value, to determine whether: a given compute task is a real-time compute task 532.1 that should be completed as soon as processing resources allow (in parallel with storage I/O command processing) and/or meet a real-time QoS constraint; or the given compute task is a delayed compute task 532.2 that may be completed at a later time and/or meet an offline compute QoS constraint. In some embodiments, task segregation engine 530 may support additional compute task timing types and corresponding processing priorities and/or QoS constraints, such as real-time compute tasks, time horizon (e.g., within X minutes/days) delayed compute tasks (may include multiple types with different X values), event precondition (pre-replication/migration/archiving) delayed compute tasks, and/or other delay types. In some embodiments, delayed compute tasks

532.2 with relatively long time constraints may enable storage devices to complete large compute tasks that would not be possible in real-time, particularly when sharing resources with processing storage commands.

In some embodiments, task segregation engine 530 may use a scheduling tag generator 534 to differentiate between compute commands for real time compute tasks 532.1 and delayed compute tasks 532.2. For example, scheduling tag generator 534 may be configured to generate a scheduling tag that includes an indicator or parameter value that corresponds to real-time compute tasks 532.1 or delayed compute tasks 532.2. In some embodiments, scheduling tags may include a compute command priority value corresponding to the priority values used by priority segregator 532 and/or a scheduling tag value or flag corresponding to the different compute task timing types. For example, scheduling tag generator 534 may insert a command parameter that includes a real-time scheduling tag for real-time compute tasks 532.1 or a delayed scheduling tag for delayed compute tasks 532.2. In some embodiments, a scheduling tag priority value may correspond to a storage processing task and/or background task prioritization scheme, such as a hierarchical or numerical set of task priority levels used by a command processor in storage controller 540, to enable compute tasks to be inserted into existing storage processing and idle state processing queues.

Time manager 536 may be configured to manage the allocation of storage and/or compute commands to assure that QoS constraints are met for storage and compute requests received by request handler 522. For example, time manager 536 may be configured to allocate and/or determine pending commands issued to one or more storage devices, receive or determine estimated command processing times, monitor elapsed processing times, and/or control operational states to support real-time and/or delayed compute task processing. In some embodiments, time manager 536 may include or access command metadata, such as a command management table or similar data structure, for tracking a task type (e.g., storage command, real-time compute command, delayed compute command, etc.) and/or priority value, a command start time, an elapsed time, and a target QoS time constraint for each pending command. In some embodiments, time manager 536 may include or access an estimator configured to estimate the expected processing time of each command and/or selectively estimate expected processing time for compute tasks or delayed compute tasks. In some embodiments, time manager 536 may receive estimated processing times from storage controller 540 for pending commands issued to storage controller 540. In some embodiments, time manager 536 may be configured to assist request handler 422 in determining how storage commands and/or compute commands are allocated among a plurality of storage devices to support meeting QoS constraints, load balancing, and/or dependencies and failover for larger compute tasks.

In some embodiments, storage and/or compute requests may include a time constraint. In some embodiments, requests may not include a time constraint and time manager 536 may determine it. For instance, a stakeholder of an application may set predefined QoS time constraints for various storage commands (e.g., such as storage commands called from specific methods, modules, or applications, etc.), various storage command types (e.g., reads, writes, deletes, certain compute operation types, etc.), the time of day, day of year, and/or other parameters, and time manager 536 may select the appropriate time constraint based on the request, such as the nature of the storage command, the sender of the storage command, a date and/or time the request was received and/or the storage command is to be executed, etc. Other variations are also possible and contemplated.

In some embodiments, host storage manager 520 may be configured to manage operating states of one or more storage devices, such as through storage controller 540. For example, storage devices may support: a storage processing state where the storage device is actively processing storage I/O commands and/or real-time compute tasks in real-time using the full processing resources of the storage device; an idle processing state where the storage device is not receiving storage I/O commands and/or real-time compute tasks to enable background tasks and storage device maintenance functions; and/or a power saving state 576 where the storage device is powered down or placed in a low power state that allows largely passive monitoring but little or no active processing of background or compute tasks. In some embodiments, host storage manager 520 may be configured to issue control commands to storage devices to control whether a storage device is in a particular state. For example, host storage manager 520 may issue state change control commands to initiate the storage processing state (generally before issuing storage commands or real-time compute commands), idle state (generally when no pending storage commands or real-time compute commands are allocated to or expected for the storage device), and/or initiate power saving state (generally when no further storage or compute commands are expected for the storage device and a buffer time for background tasks (and/or to prevent overly frequent power cycling) has elapsed. In some embodiments, time manager 536 may be configured to use estimated processing times for delayed compute tasks to manage and delay initiating the power saving state from the idle state. For example, time manager 536 may compare an elapsed processing time for pending delayed compute tasks to an estimated processing time for those tasks and delay control command generator 538 from generating a state change command to initiate the power saving state. In some embodiments, control command generator 538 may monitor for pending delayed compute commands to be complete and delay the state change command for power saving mode until all commands are complete, regardless of estimated or elapsed time.

Storage controller 540 may include an interface protocol and/or set of functions, parameters, and/or data structures for executing storage and compute commands for host data stored in corresponding storage devices or storage media. For example, storage controller 540 may include functions for receiving and processing storage and compute commands from one or more host system, such as host storage manager 520, and processing corresponding storage and compute operations using data store 590. In some embodiments, storage controller 540 may be configured to manage command queuing and timing to support predetermined QoS and/or completion time metrics. For example, storage controller 540 may determine whether compute commands are real-time compute commands or delayed compute commands that may be processed during idle time alongside background tasks.

In some embodiments, storage controller 540 may include a plurality of hardware and/or software modules configured to use processor 514 and memory 516 to handle or manage defined operations of storage controller 540. For example, storage controller 540 may include a command handler 542 configured to receive storage, compute, and/or control commands and initiate processing through one or more processing queues and corresponding processing paths. Storage controller 540 may include a background task manager 548 configured to determining and prioritizing background tasks for maintaining storage operations. Storage controller 540 may include a command processor 562 configured to process storage, compute, and background tasks or operations corresponding to storage and compute commands and background tasks from background task manager 548. Storage controller 540 may include a state machine 570 configured to determine and initiate storage device states, such as storage processing state 572, idle state 574, and/or power saving state 576. Storage controller 540 may include an estimator 578 configured to estimate processing times based on processing queues, such as estimated processing time for delayed compute tasks based on idle state processing queue 566.

Command handler 542 may be configured to receive storage commands and/or compute commands from one or more hosts and initiate corresponding processing operations. For example, command handler 542 may provide an API or function call that enables host storage manager 520 to issue commands targeting host data stored in one or more edge storage devices including or connected to storage controller 540. In some embodiments, command handler 542 may handle storage commands and compute commands through distinct interfaces and/or processing paths. For example, command handler 542 may include a host storage command path 544 and a host compute command path 546. Host storage command path 544 may be configured to parse storage I/O commands, such as read commands, write commands, and delete commands targeting host data in data store 590. For example, host storage command path 544 may parse incoming storage commands and initiate storage operations though command processor 562 that target a specific host LBA or data object GUID for a read, write, or delete operation configured to store, retrieve, or remove host data from data store 590. In some embodiments, command handler 542 may be configured to return command complete and/or error messages and/or transmit data results to a host system, such as through host storage manager 520.

Host compute command path 546 may be configured to parse compute commands, such host data transformations, that read, process, and return or store derivative data from host data in data store 590. For example, host compute command path 546 may parse incoming compute commands and initiate compute tasks that target a specific set of host LBAs and/or GUIDs for a defined compute operation, such as a data transformation algorithm, a media frame detection and separation algorithm, an event or object detection algorithm, and/or a domain transformation algorithm, creating derivative data from the targeted host data. Compute command processing may return transformed or derivative data to host storage manager 520, such as to return a result to the requesting application and/or store the result to another storage device, and/or store the transformed or derivative data back to data store 590, with or without modifying the raw host data in the original read location in the storage device or media. In some embodiments, host compute command path 546 may be configured to further segregate compute commands based on priority or real-time and delayed compute tasks. For example, host compute command path 546 may include logic for parsing a scheduling tag 546.1 that includes a scheduling indicator or priority value to determine real-time compute tasks and delayed compute tasks. In some embodiments, host compute command path 546 may allocate real-time compute commands, tasks, or operations to storage processing queue 564 and delayed compute commands, tasks, or operations to idle state processing queue 566.

Background task manager 548 may be configured to determine and prioritize background tasks used by storage devices to maintain storage media and internal operations. For example, background task manager 548 may include logic, APIs, and/or function calls for determining background task trigger conditions and allocating various background tasks to idle state processing queue 566. In some embodiments, background tasks may include garbage collection 550, media scan 552, wear leveling 554, internal data migration 556, device health tracking 558, and/or other background tasks for managing stored data, metadata, and/or media within the storage device. For example, garbage collection 550 may include logic for removing deleted data units (e.g., data blocks or objects) and/or consolidating good data units into less fragmented use of memory space. Media scan 552 may include logic for systematically reading stored data to determine error rates and/or media device health. Wear leveling 554 may include logic for systematically migrating low usage data units periodically (e.g., static wear leveling) to prevent specific storage locations from wearing more quickly than others. Internal data migration 556 may include logic for global wear leveling, bad block consolidation, defragmentation, and other forms of moving data units between media locations within a storage device on an automated bases for internal management reasons. Device health tracking may include logic for systematically aggregating I/O, device, and/or storage location parameters to monitor device health or other aggregate parameters and report those parameters to host systems or storage management controllers. Other background tasks are possible and may include any task initiated by the storage device during an idle state that is not responsive to a host storage command or host compute command.

In some embodiments, background task manager 548 may include background task priority handler 560. For example, background task priority handler 560 may assign a priority value to each type of background task. In some embodiments, background tasks may be mapped to static priority values, where each background task maps to an ordered set of priority values on a fixed basis. In some embodiments, background tasks may be determined dynamically based on one or more parameters, such as a base priority, elapsed time since the background task was last completed, one or more task triggers (e.g. error rate thresholds, unreadable error events, uncollected delete thresholds, storage usage, etc.), etc. In some embodiments, a background task priority value may be provided with each background task sent to command processor 562.

Command processor 562 may be configured to process storage, compute, and background operations using processor 514 and data store 590. For example, command processor 562 may include logic for processing storage, compute, and background tasks generated by command handler 542 and/or background task manager 548. In some embodiments, command processor 562 may include a set of processing paths for storage, compute, and background tasks, where each task type may correspond to a different set of functions, parameters, and data structures for initiating, completing, and providing results and/or status information for the storage, compute, or background task.

In some embodiments, command processor 562 may use one or more queues for managing pending tasks allocated to command processor 562 by command handler 542 and/or background task manager 548. For example, command processor 562 may include a storage processing queue 564 and an idle state processing queue 566. In some embodiments, storage processing queue 564 may be an active or real-time processing queue configured to respond to command handler 542 and provide efficient processing of real-time storage and compute operations in a storage processing queue order. For example, command processor 562 may select tasks from storage processing queue 564 during storage processing state 572 in order to utilize processor 514 and other storage device resources (e.g., media channels, error correction engines, storage buffers. cache, etc.). In some embodiments, idle state processing queue 566 may be an internal or delayed processing queue configured to process background tasks when resources are not needed for real-time commands. For example, command processor 562 may select tasks from idle state processing queue 566 during idle state 574 using processor 514 and other storage device resources. In some embodiments, real-time compute tasks may be allocated to storage processing queue 564 and delayed compute tasks may be allocated to idle state processing queue 566. In some embodiments, command processor 562 may support multiple processor cores and threaded operations to enable parallel processing of tasks from storage processing queue 564 during storage processing state 572 or idle state processing queue 566 during idle state 574.

In some embodiments, command processor 562 may include queuing and/or selection logic 568 configured to order storage processing queue 564 and/or idle state processing queue 566 and determine how command processor 562 selects a next task to process. For example, command processor 562 may include queuing logic for storage processing queue 564 and idle state processing queue 566 that determines the respective queue orders as tasks are sent to command processor 562. In some embodiments, tasks may be ordered in a first-in-first-out (FIFO), last-in-first-out (LIFO), random, parameter-based order (e.g. operation size, estimated processing time, etc.), location-based order (grouping operations based on their proximity in the storage medium), and/or other ordering schemes. In some embodiments, tasks may be ordered, reordered, and/or new tasks inserted using a task priority scheme. For example, storage, compute, and/or background tasks may include a task priority value used to prioritize them within the queue orders that is received from command handler 542, background task manager 548, and/or assigned by queuing/selection logic 568. In some embodiments, delayed compute tasks may receive priority processing relative to background tasks from background task manager 548. For example, delayed compute tasks may be allocated to the top (next to be selected) of idle state processing queue 566 based on scheduling tag 546.1 and regardless of the priority values of the background tasks already in the queue (or added while delayed compute tasks are pending in the queue). In another example, delayed compute tasks may include a priority value in scheduling tag 546.1 that places them after some background tasks, such as garbage collection 550, but ahead of other background tasks, such as media scan 552 and device health tracking 558. Idle state processing queue 566 may have a plurality of background tasks arranged in a queue order based on their respective priority values and queuing/selection logic 568 may place a new delayed compute task between adjacent background tasks in the queue order with a next higher and a next lower priority value.

State machine 570 may be configured to determine and maintain state information that determines, among other things, which operations have control of processor 514 and other storage device resources. For example, state machine 570 may support: a storage processing state 572 where the storage device is actively processing storage I/O commands and/or real-time compute tasks in real-time from storage processing queue 564 using the full processing resources of the storage device; an idle state 574, where the storage device is not receiving storage I/O commands and/or real-time compute tasks, to enable background tasks and delayed compute tasks to use processing resources; and/or a power saving state 576, where the storage device is powered down or placed in a low power state that allows largely passive monitoring but little or no active processing of storage, background, or compute tasks. In some embodiments, state machine 570 may be configured to receive or determine control commands to initiate state changes from one state to another. For example, state machine 570 may receive state change control commands to initiate the storage processing state (generally before issuing storage commands or real-time compute commands), idle state (generally when no pending storage commands or real-time compute commands are allocated to or expected for the storage device), and/or initiate power saving state (generally when no further storage or compute commands are expected for the storage device and a buffer time for background tasks (and/or to prevent overly frequent power cycling) has elapsed.

Estimator 578 may be configured to estimate processing times for command processor 562. For example, estimator 578 may evaluate the tasks in storage processing queue 564 and/or idle state processing queue 566, assign an estimated processing time to each task, and aggregate the processing times to determine a total processing time for the processing queue. In some embodiments, estimator 578 may be configured for calculating processing time estimates based on parallel and/or threaded processing and/or multiple concurrent processing queues. In some embodiments, estimator 578 may provide estimated processing times to a host system, such as host storage manager 520. For example, estimator 578 may send a control message or maintain a registry or host-accessible data structure containing processing time estimates for storage processing queue 564 and/or idle state processing queue 566. In some embodiments, processing time estimates may include both total processing time estimates for all tasks in the queue, an array of estimates for each task in the queue, and/or estimates for predefined events, such as all delayed compute tasks being complete in idle state processing queue 566. In some embodiments, estimator 578 may be configured to provide processing time estimates to command handler 542 and command handler 542 may selectively reject compute commands that exceed the processing capabilities and/or time constraints for completing the compute commands.

In some embodiments, estimator 578 may use machine learning logic that is trained based on previously processed storage, compute, and/or background commands and/or processing queue depths and configurations. The features of these commands, such as their processing time, the command types (e.g., read, write, compute, delete, etc.), other processing parameters, etc., may be aggregated and used to create feature sets for training a machine learning model. Any suitable learning approach may be used, such as supervised learning, unsupervised learning, and/or reinforcement learning, or other approaches such as topic modeling, meta-learning, etc. Similarly, any suitable machine learning model may be used, such as artificial neural networks, decision trees, support vector machines, regression analysis, Bayesian networks, and federated learning models. By way of example, data describing one-hundred thousand write commands for writing a data of a certain size or within certain size ranges to a particular solid-state storage device (e.g., device model, memory type, etc.) may be used to train machine learning logic for estimator 578. As command processor 562 processes additional write commands, command processor 562 may determine the attributes of the write commands and provide them to estimator 578, which may use them to further train and enhance the precision of the machine learning logic. The machine learning logic may output a probability score or some other metric for determining whether the storage command can be suitably processed.

Figure 6:
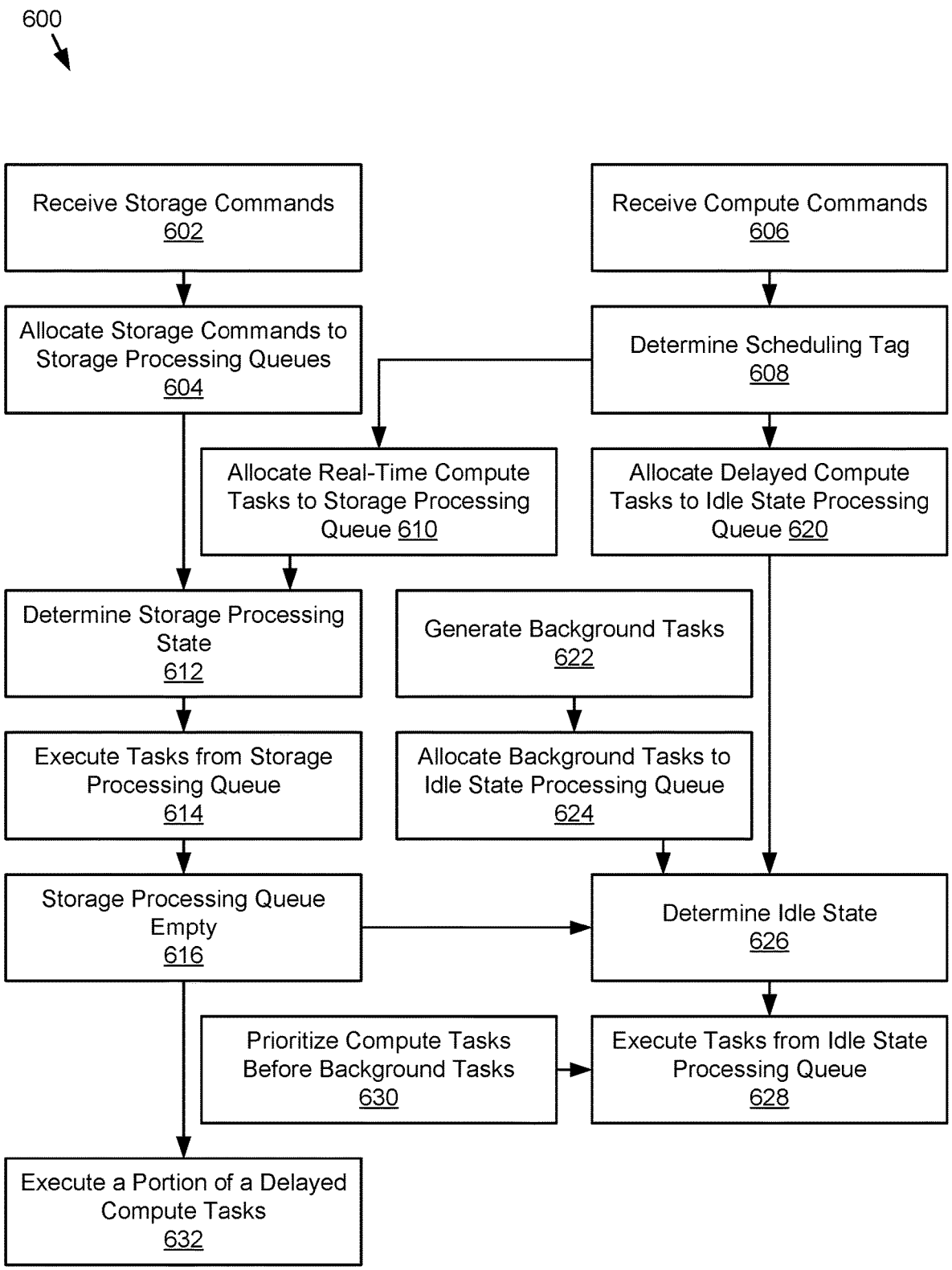
FIG. 6 is a flowchart of an example method for managing idle-time compute tasks in a storage device.

As shown in FIG. 6, storage system 500 may be operated according to an example method for managing idle-time compute tasks in a storage device, i.e. according to method 600 illustrated by blocks 602-632 in FIG. 6.

At block 602, a storage command may be received by a storage device. For example, the command handler of the storage device may receive a read, write, delete, or other storage command for execution using the storage medium in the storage device.

At block 604, the storage command and/or corresponding storage task or operation may be allocated to a storage processing queue. For example, the command handler may parse the storage command and send a corresponding storage task to a command processor for addition to a storage processing queue for real-time processing tasks.

At block 606, a compute command may be received by the storage device. For example, the command handler of the storage device may receive a data transformation, data processing, data extraction, data calculation, domain transformation, or other compute command for execution using the storage medium in the storage device.

At block 608, a scheduling tag may be determined from the compute command. For example, the command handler may parse the command parameters associated with the compute command to identify the scheduling tag that determines the time constraint for the compute command, such as a real-time or delayed compute task.

At block 610, real-time compute tasks may be allocated to the storage processing queue. For example, the command handler may have determined the scheduling tag to correspond to a real-time compute command at block 608 and send the corresponding compute task to the command processor for addition to a storage processing queue for real-time processing tasks.

At block 612, a storage processing state may be determined. For example, a state machine may determine the storage device to be in a storage processing state based on the received and accumulated storage processing and compute commands and/or a related state change control command that places the storage device in the storage processing state.

At block 614, tasks may be selected and executed from the storage processing queue. For example, the command processor may order the accumulated storage processing and compute commands in the storage processing queue and select a next task, whether a storage task or a real-time compute task, from the storage processing queue. In some embodiments, block 614 may be repeated until no pending tasks remain in the storage processing queue.

At block 616, the storage processing queue may be determined to be empty. For example, the command processor may determine the absence of storage or compute tasks in the storage processing queue as a trigger condition for a state change and/or an opportunity to selectively process delayed compute tasks from an idle state processing queue.

At block 620, delayed compute tasks may be allocated to the idle state processing queue. For example, the command handler may have determined the scheduling tag to correspond to a delayed compute command at block 608 and send the corresponding compute task to the command processor for addition to the idle state processing queue.

At block 622, background tasks may be generated. For example, a background task manager may determine or generate background tasks, such as garbage collection, media scan, wear leveling, etc., based on background task trigger conditions.

At block 624, background tasks may be allocated to the idle state processing queue. For example, the background task manager may send generated background tasks to the command processor for addition to the idle state processing queue.

At block 626, an idle state may be determined. For example, the state machine may receive notification of the empty storage processing queue at block 616 and/or a state change control command from the host system and initiate an idle state.

At block 628, tasks may be selected and executed from the idle state processing queue. For example, the command processor may order the accumulated background tasks and accumulated delayed compute tasks in the idle state processing queue and select a next task, whether background task or delayed compute task, from the idle state processing queue. In some embodiments, block 628 may be repeated until no pending tasks remain in the idle state processing queue or the state changes to the storage processing state or a power saving state.

At block 630, delayed compute tasks may be prioritized before background tasks in some embodiments. For example, the command processor may order the idle state processing queue by giving delayed compute tasks a higher priority than background tasks and/or bypass background tasks in the queue in favor of delayed compute tasks.

At block 632, at least a portion of a delayed compute task may be processed during the storage processing state. For example, in response to no storage or real-time compute tasks pending and available processing capacity, the command processor may select a delayed compute task from idle state processing queue and execute at least a portion of the delayed compute task until additional storage or real-time compute tasks are received or the state changes to an idle state or power saving state.

Figure 7:
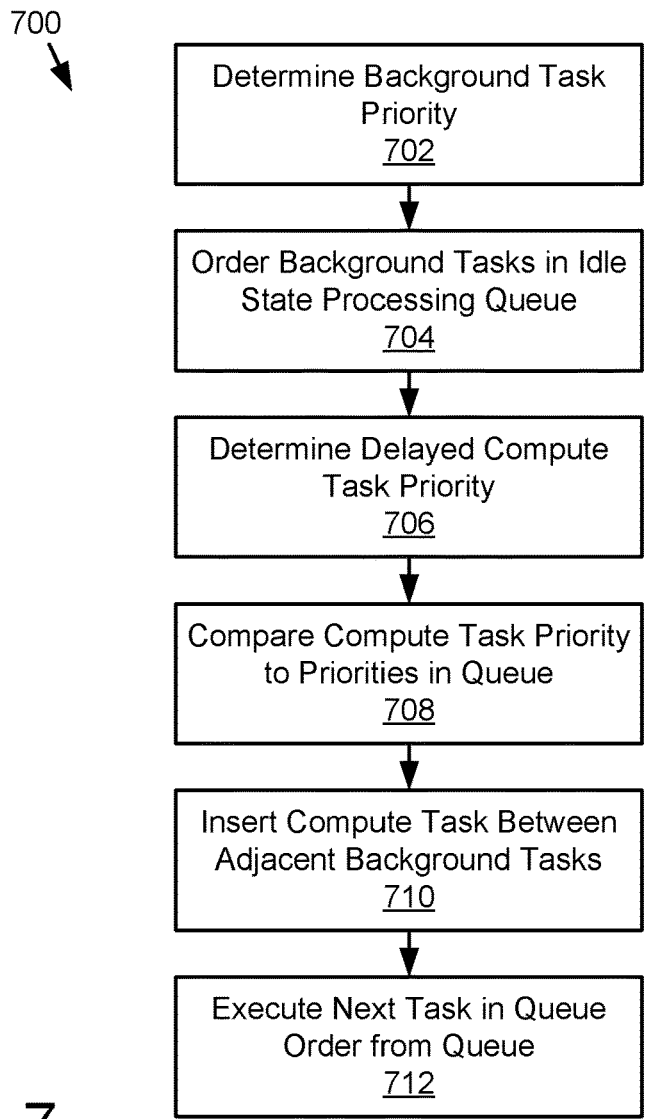
FIG. 7 is a flowchart of an example method for prioritizing idle-time compute tasks in a storage device.

As shown in FIG. 7, storage system 500 may be operated according to an example method for prioritizing idle-time compute tasks in a storage device, i.e. according to method 700 illustrated by blocks 702-712 in FIG. 7.

At block 702, background task priority may be determined for a plurality of background tasks. For example, the background task manager may determine a task priority value for each background task prior to sending the background task to the command processor.

At block 704, background tasks may be ordered in the idle state processing queue. For example, as background tasks are received, the command processor may add them to the idle state processing queue in accordance with their priority and/or another queue ordering scheme.

At block 706, priority for a delayed compute task may be determined. For example, the command handler may determine or assign a task priority value for each delayed compute task based on the scheduling tag and/or another prioritization value or logic.

At block 708, compute task priority values may be compared to the priority values of background and/or other delayed compute tasks in the idle state processing queue. For example, the command processor may include ordering and selection logic for inserting new tasks into the idle state processing queue and use comparative task priority values to order tasks in a priority-based queue order.

At block 710, a delayed compute task may be inserted between adjacent background tasks in the idle state processing queue. For example, the command processor may determine two sequential background tasks in an initial order of the idle state processing queue and, based on the priority value of the delayed compute task falling between the respective priority values of the adjacent background tasks, insert the delayed compute tasks between the adjacent background tasks such that the delayed compute task will be executed between the two background tasks in the updated queue order.

At block 712, a next task in the queue order of the idle state processing queue may be executed. For example, the command processor may select the next background or delayed compute task in the queue order of the idle state processing queue. In some embodiments, block 712 may be repeated until no pending tasks remain in the idle state processing queue or the state changes to the storage processing state or a power saving state.

Figure 8:
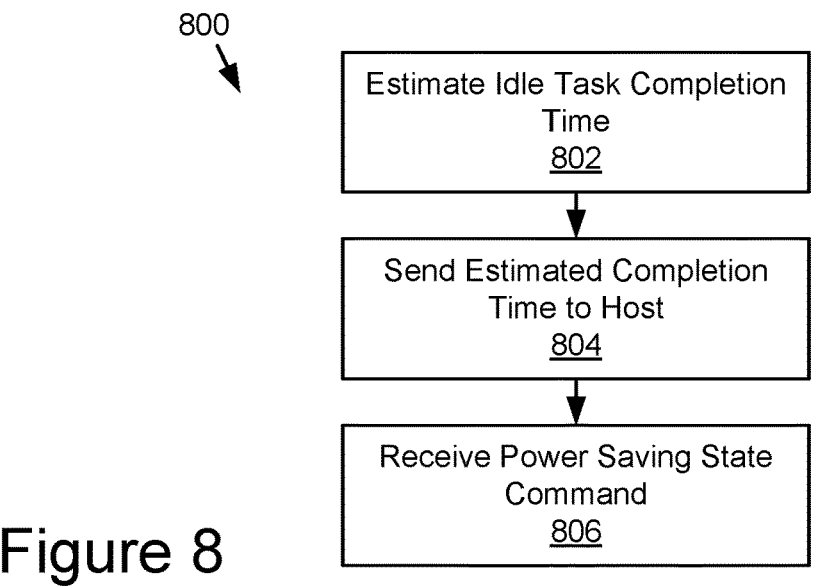
FIG. 8 is a flowchart of an example method for delaying power saving mode in a storage device.

As shown in FIG. 8, storage system 500 may be operated according to an example method for delaying power saving mode in a storage device, i.e. according to method 800 illustrated by blocks 802-806 in FIG. 8.

At block 802, an idle task completion time may be estimated. For example, an estimator may determine a total completion time for all background and delayed compute tasks in the idle state processing queue and/or a portion thereof, such as the last delayed compute task in the idle state processing queue.

At block 804, an estimated idle task completion time may be sent to the host. For example, the estimator may report one or more completion time values to the host system in a control message and/or a memory location accessible to the host system.

At block 806, a power saving state change command may be received from the host system. For example, the host system may delay sending the power saving state change command until an elapsed processing time had met a selected completion time value and the state machine may not enter the power saving state until the power saving state change command is received.

Figure 9:
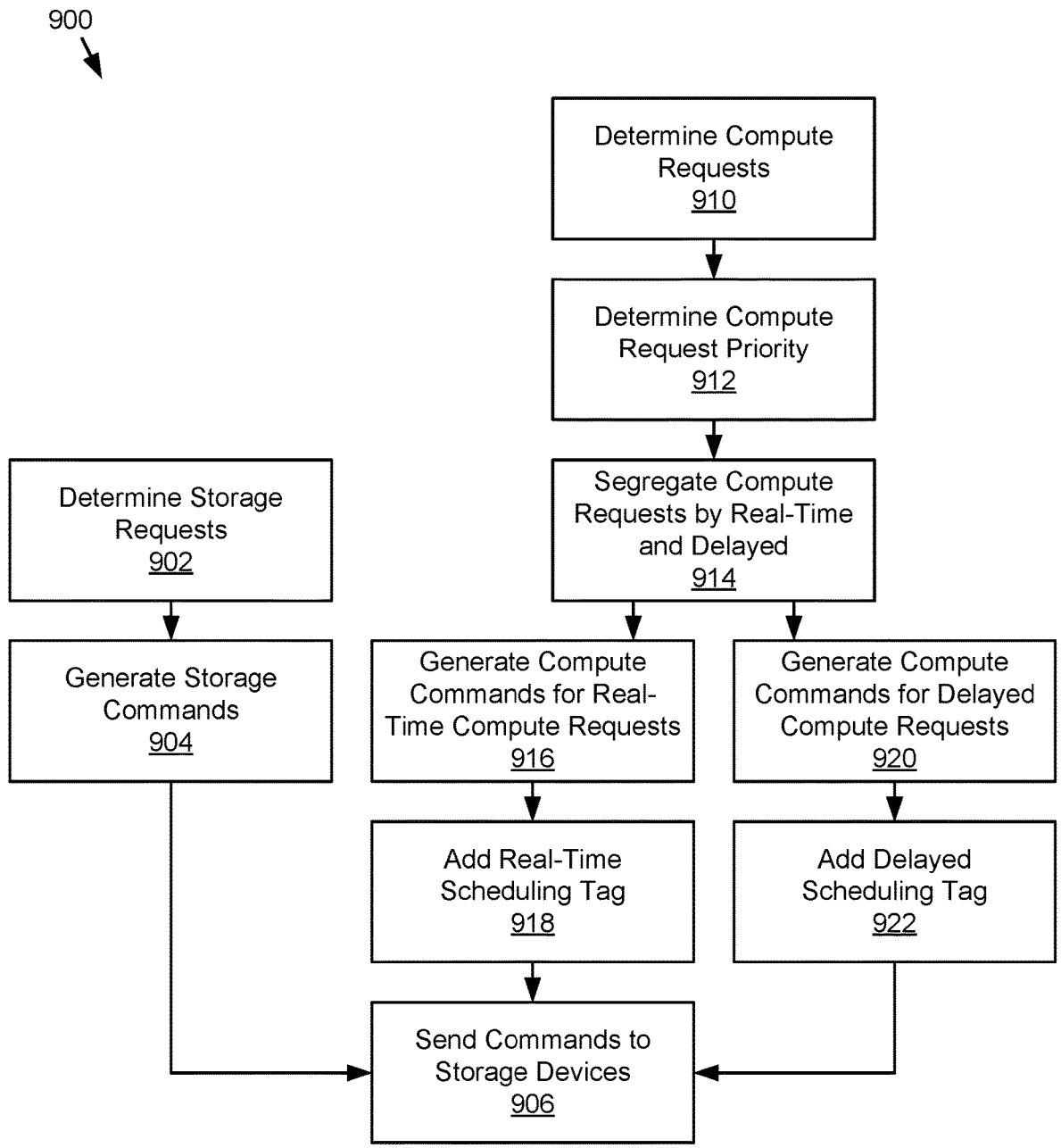
FIG. 9 is a flowchart of an example method for managing idle-time compute tasks in a host device.

As shown in FIG. 9, storage system 500 may be operated according to an example method for managing idle-time compute tasks in a host device, i.e. according to method 900 illustrated by blocks 902-922 in FIG. 9.

At block 902, a storage request may be received and/or determined. For example, a request handler may receive a client storage request and/or a storage request generated by the host system.

At block 904, one or more storage commands may be generated from the storage request. For example, the request handler may parse the storage request and generate one or more corresponding storage commands, such as read, write, delete, or other storage commands.

At block 906, commands may be sent to one or more storage devices. For example, the host system may be in communication with one or more storage devices for executing storage and compute commands and the request handler may send the generated commands to one or more storage devices for execution.

At block 910, one or more compute requests may be received or determined. For example, the request handler may receive a client compute request and/or a compute request may be generated by the host system.

At block 912, compute request priorities may be determined for the compute requests. For example, a task segregation engine may determine compute request priorities based on time constraints for completing compute task processing.

At block 914, compute requests may be segregated by real-time compute requests and delayed compute requests. For example, the tasks segregation engine may use the time constraints to segregate compute tasks into at least real-time processing priority and delayed processing priority.

At block 916, compute commands may be generated for real-time compute requests. For example, the request handler may generate compute commands for real-time compute requests determined at block 914.

At block 918, real-time scheduling tags may be added to the compute commands corresponding to real-time compute requests. For example, the task segregation engine may insert a real-time scheduling tag as a parameter in the compute commands determined to be real-time at block 914 before they are sent to storage devices at block 906.

At block 920, compute commands may be generated for delayed compute requests. For example, the request handler may generate compute commands for delayed compute requests determined at block 914.

At block 922, delayed scheduling tags may be added to the compute commands corresponding to delayed compute requests. For example, the task segregation engine may insert a delayed scheduling tag as a parameter in the compute commands determined to be delayed at block 914 before they are sent to storage devices at block 906.

Figure 10:
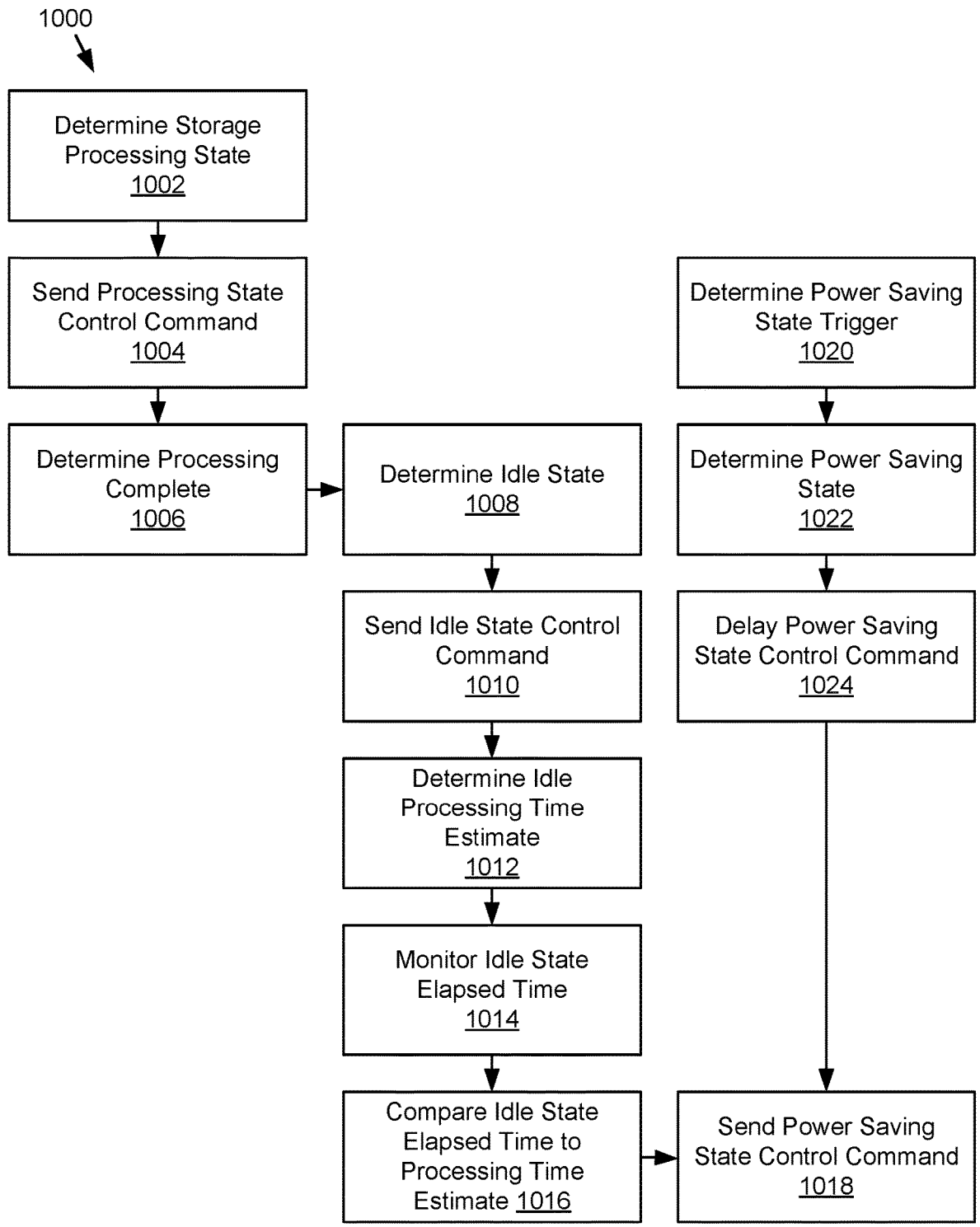
FIG. 10 is a flowchart of an example method for controlling storage device states in a host device.

As shown in FIG. 10, storage system 500 may be operated according to an example method for controlling storage device states in a host device, i.e. according to method 1000 illustrated by blocks 1002-1024 in FIG. 10.

At block 1002, a storage processing state may be determined. For example, a control command generator may determine a trigger condition for storage processing by a target storage device.

At block 1004, a storage processing state control command may be sent to a storage device. For example, the control command generator may generate and send a storage processing state control command to the storage device for initiating a storage processing state.

At block 1006, storage processing may be determined to be complete. For example, the control command generator may determine a next trigger condition, such as the processing of all storage and compute commands sent to the storage device being complete.

At block 1008, an idle state may be determined. For example, the control command generator, responsive to storage processing being complete at block 1006, may determine a trigger condition for the storage device to enter an idle state.

At block 1010, an idle state control command may be sent to the storage device. For example, the control command generator may generate and send an idle state control command to the storage device for initiating an idle state.

At block 1012, an idle processing time estimate may be received or determined. For example, a time manager may estimate or receive an estimate from the storage device for the processing completion time for a delayed compute commands and/or aggregate delayed compute commands and background tasks in an idle state processing queue.

At block 1014, an idle state elapsed time may be monitored. For example, the time manager may monitor the elapsed time from a start time of the idle state and/or a start time of one or more delayed compute commands or tasks.

At block 1016, idle state elapsed time may be compared to the idle processing time estimate. For example, the time manager may compare one or more idle state elapsed time values from block 1014 to one or more processing time estimate values from block 1012 to determine when elapsed times meet processing time estimates for triggering an end of idle state processing and initiation of a power saving state.

At block 1018, a power saving state control command may be sent to the storage device. For example, the control command generator may send a power saving state control command to the storage device in response to idle state processing time elapsing to enable processing of one or more delayed compute tasks and/or intervening background tasks.

At block 1020, a power saving state trigger may be determined. For example, the control command generator may receive or determine a power saving state trigger, such the end of default idle state period (e.g. a fixed period of time from the initialization of the idle state to allow a predefined amount of background task processing) and/or other power management triggers for initiating a power saver mode.

At block 1022, power saving mode may be determined. For example, the control command generator may generate a power saving state control command for initiating a power saving state in the storage device.

At block 1024, sending the power saving state control command may be delayed. For example, the control command generator may require an indicator from the time manager based on adequate idle state processing time elapsing for one or more delayed compute tasks before sending the command at block 1018.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

Various aspects of the present technology may be embodied as a system, method, apparatus, computer program product or another aspect. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer-readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage system comprising:
   a storage device comprising:
      a storage medium configured to store host data; and
      a storage controller, comprising a processor and a memory, configured to:
         receive, from a host system, host storage commands for reading and writing the host data in the storage medium;
         direct, responsive to receiving host storage commands, host storage commands to a host storage command path configured to parse storage input/output operations;
         receive, from the host system, host compute commands for executing, using the processor, host compute tasks, wherein:
            the host compute commands each:
               target a set of host data in the storage medium;
               define a host compute operation for that host compute command; and
               include a scheduling tag as a parameter received from the host system in that host compute command; and
            the host compute operation is configured to create derivative data from the set of host data;
         direct, responsive to receiving host compute commands, host compute commands to a host compute command path that is distinct from the host storage command path and configured to execute host compute operations;
         determine, independent of the host storage command path and the host compute command path, background task trigger conditions for background tasks configured for execution during an idle state;
         determine a storage processing state for executing host storage commands;
         determine the idle state for executing background tasks in an absence of pending host storage commands; and
         selectively execute, based on the scheduling tag of a first host compute command, a first host compute task during the idle state.

2. The storage system of claim 1, wherein the storage controller is further configured to:
   selectively execute, based on the scheduling tag of a second host compute command, a second host compute task during the storage processing state.

3. The storage system of claim 2, wherein:
   the scheduling tag of the first host compute command indicates a delayed compute task; and
   the scheduling tag of the second host compute command indicates a real-time compute task.

4. The storage system of claim 2, wherein the storage controller is further configured to:
   allocate host storage tasks from the host storage commands to a storage processing queue;
   allocate background tasks to an idle state processing queue;
   allocate, based on the scheduling tag of the first host compute command, the first host compute task to the idle state processing queue; and
   allocate, based on the scheduling tag of the second host compute command, the second host compute task to the storage processing queue.

5. The storage system of claim 4, wherein the storage controller is further configured to:
   selectively execute, before the background tasks in the idle state processing queue, the first host compute task.

6. The storage system of claim 4, wherein:
   the idle state processing queue include a plurality of background tasks;
   each background task of the plurality of background tasks includes a background task priority value;
   the idle state processing queue has a queue order based on the background task priority values;
   the scheduling tag of the first host compute command includes a compute task priority value; and
   the storage controller is further configured to insert, based on a comparison of the compute task priority value and adjacent background task priority values of adjacent background tasks in the queue order of the idle state processing queue, the first host compute task between the adjacent background tasks in the queue order of the idle state processing queue.

7. The storage system of claim 4, wherein the background tasks are selected from:
   garbage collection tasks;
   media scan tasks;
   wear levelling tasks;
   internal data migration tasks; and
   storage device health tracking tasks.

8. The storage system of claim 4, wherein the storage controller is further configured to:
   selectively execute, responsive to the storage processing queue being empty, a portion of the first host compute task during the storage processing state.

9. The storage system of claim 2, further comprising the host system, wherein the host system comprises:
   a host processor;

a host memory;
a request handler configured to:
   determine compute requests for at least one host application; and
   generate, based on the compute requests, host compute commands, wherein the host compute commands include the first host compute command and the second host compute command; and
a task segregation engine configured to:
   determine the first host compute task; and
   add, to the first host compute command, the scheduling tag of the first host compute command.

10. The storage system of claim 9, wherein:
the request handler is further configured to generate a plurality of delayed host compute tasks;
the plurality of delayed host compute tasks includes the first host compute task;
the task segregation engine is further configured to add a delayed scheduling tag to each host compute command for each delayed compute task of the plurality of delayed host compute tasks; and
the storage controller is further configured to:
   accumulate, during the storage processing state, background tasks in an idle state processing queue; and
   accumulate, during the storage processing state, the plurality of delayed host compute tasks in the idle state processing queue.

11. The storage system of claim 10, wherein:
the storage controller is further configured to:
   receive control commands for changing among:
      the storage processing state;
      the idle state; and
      a power saving state;
   determine, based on the accumulated background tasks and the accumulated plurality of delayed host compute tasks in the idle state processing queue, an idle processing time; and
   send the idle processing time to the host system;
the host system further comprises a time manager; and
the time manager is configured to:
   monitor an idle state elapsed time during the idle state; and
   delay a control command for the power saving state until the idle state elapsed time meets the idle processing time.

12. A computer-implemented method comprising:
receiving, by a storage device and from a host system, host storage commands for reading and writing host data in a storage medium of the storage device;
directing, responsive to receiving host storage commands, host storage commands to a host storage command path configured to parse storage input/output commands;
receiving, by the storage device and from the host system, host compute commands for executing host compute tasks, wherein:
   the host compute commands each:
      target a set of host data in the storage medium;
      define a host compute operation for that host compute command; and
      include a scheduling tag as a parameter received from the host system in that host compute command; and
   the host compute operation is configured to create derivative data from the set of host data;
directing, responsive to receiving host compute commands, host compute commands to a host compute command path that is distinct from the host storage command path and configured to execute host compute operations;
determining, independent of the host storage command path and the host compute command path, background task trigger conditions for background tasks configured for execution during an idle state;
determining, by the storage device, a storage processing state for executing host storage commands;
determining, by the storage device, the idle state for executing background tasks in an absence of pending host storage commands;
selectively executing, by the storage device and based on the scheduling tag of a first host compute command, a first host compute task during the idle state; and
selectively executing, by the storage device and based on the scheduling tag of a second host compute command, a second host compute task during the storage processing state.

13. The computer-implemented method of claim 12, further comprising:
allocating, by the storage device, host storage tasks from the host storage commands to a storage processing queue;
allocating, by the storage device, background tasks to an idle state processing queue;
allocating, by the storage device and based on the scheduling tag of the first host compute command, the first host compute task to the idle state processing queue; and
allocating, by the storage device and based on the scheduling tag of the second host compute command, the second host compute task to the storage processing queue.

14. The computer-implemented method of claim 13, further comprising:
selectively executing, by the storage device and before executing the background tasks in the idle state processing queue, the first host compute task.

15. The computer-implemented method of claim 13, further comprising:
ordering, by the storage device and based on a background task priority value for each background task of a plurality of background tasks, the idle state processing queue in a queue order; and
inserting, by the storage device and based on a comparison of a compute task priority value and adjacent background task priority values of adjacent background tasks in the queue order of the idle task processing queue, the first host compute task between the adjacent background tasks in the queue order of the idle task processing queue, wherein the scheduling tag of the first host compute command includes the compute task priority value.

16. The computer-implemented method of claim 13, further comprising:
selectively executing, by the storage device and responsive to the storage processing queue being empty, a portion of the first host compute task during the storage processing state.

17. The computer-implemented method of claim 12, further comprising:
determining, by the host system, compute requests for at least one host application;
generating, by the host system and based on the compute requests, host compute commands, wherein the host compute commands include the first host compute command and the second host compute command;

adding, by the host system and to the first host compute command, the scheduling tag of the first host compute command;

adding, by the host system and to the second host compute command, the scheduling tag of the second host compute command; and sending, by the host system, the host compute commands to the storage device.

18. The computer-implemented method of claim 17, further comprising:

generating, by the host system, a plurality of delayed host compute tasks, wherein the plurality of delayed host compute tasks includes the first host compute task;

adding, by the host system, a delayed scheduling tag to each host compute command for each delayed compute task of the plurality of delayed host compute tasks;

accumulating, by the storage device and during the storage processing state, background tasks in an idle state processing queue; and accumulating, by the storage device and during the storage processing state, the plurality of delayed host compute tasks, in the idle state processing queue.

19. The computer-implemented method of claim 18, further comprising:

receiving, by the storage device and from the host system, control commands for changing among:
the storage processing state;
the idle state; and
a power saving state;

determining, based on the accumulated background tasks and the accumulated plurality of delayed host compute tasks in the idle state processing queue, an idle processing time;

monitoring, by the host system, an idle state elapsed time for the storage device during the idle state; and delaying, by the host system, a control command for the power saving mode until the idle state elapsed time meets the idle processing time.

20. A system comprising:

a storage device comprising a storage medium configured to store host data;

means for receiving, from a host system, host storage commands for reading and writing the host data in the storage medium;

means for directing, responsive to receiving host storage commands, host storage commands to a host storage command path configured to parse storage input/output commands;

means for receiving, from a host system, host compute commands for executing host compute tasks, wherein:
the host compute commands each:
target a set of host data in the storage medium;
define a host compute operation for that host compute command; and
include a scheduling tag as a parameter received from the host system in that host compute command; and
the host compute operation is configured to create derivative data from the set of host data;

means for directing, responsive to receiving host compute commands, host compute commands to a host compute command path that is distinct from the host storage command path and configured to execute host compute operations;

means for determining, independent of the host storage command path and the host compute command path, background task trigger conditions for background tasks configured for execution during an idle state;

means for determining a storage processing state for executing host storage commands;

means for determining the idle state for executing background tasks in an absence of pending host storage commands; and means for selectively executing, based on the scheduling tag of a first host compute command, a first host compute task during the idle state.

* * * * *